Dec. 9, 1924.
P. C. BURNS
STOP PIN
Filed May 24, 1923
1,518,729
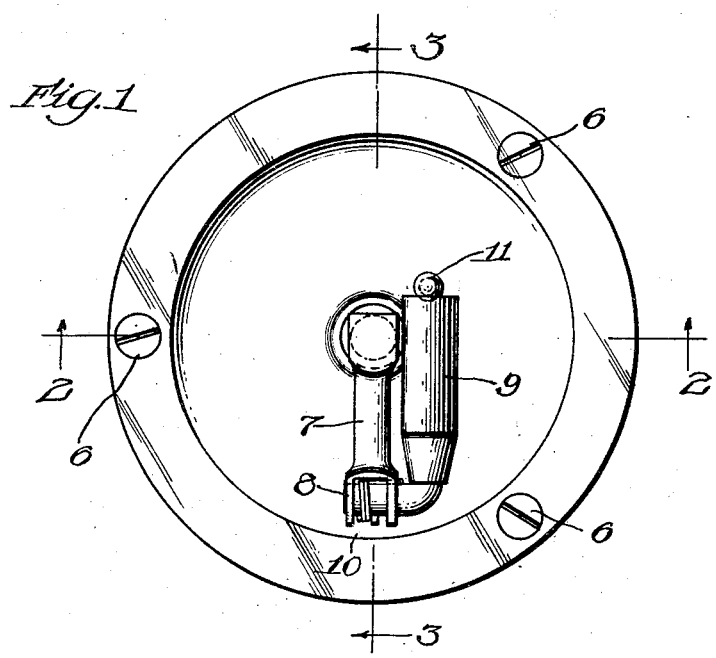
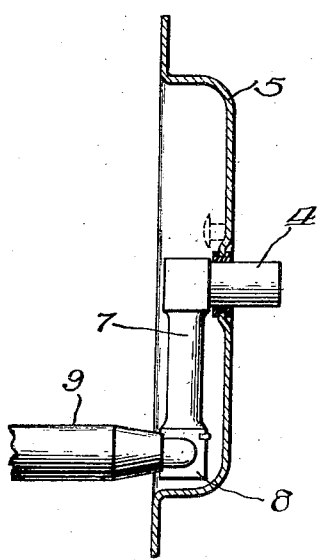
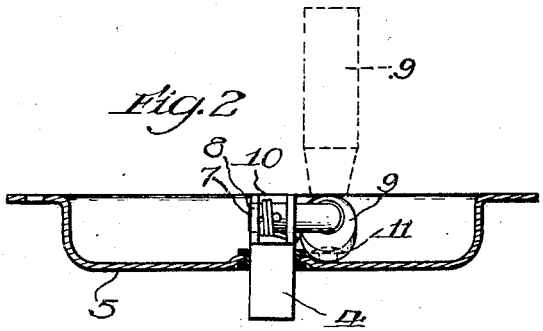
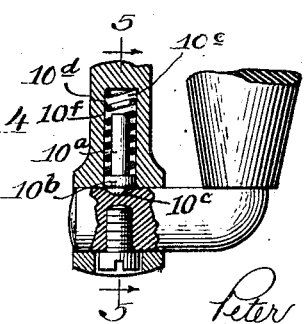
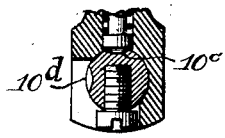
Inventor:
Peter C. Burns,
By Chas. C. Bulkley, Atty.

Patented Dec. 9, 1924.

1,518,729

UNITED STATES PATENT OFFICE.

PETER C. BURNS, OF CHICAGO, ILLINOIS, ASSIGNOR TO AMERICAN ELECTRIC COMPANY, OF CHICAGO, ILLINOIS, A CORPORATION OF ILLINOIS.

STOP PIN.

Application filed May 24, 1923. Serial No. 641,068.

*To all whom it may concern:*

Be it known that I, PETER C. BURNS, a citizen of the United States of America, and resident of Chicago, Cook County, Illinois, have invented a certain new and useful Improvement in Stop Pins, of which the following is a specification.

My invention relates to an improvement in that kind of crank handle which is removably screwed onto the end of the shaft to be driven, and particularly to a folding or collapsible crank handle which is adapted for a variety of uses. This crank handle may, for example, be employed in connection with a telephone magneto or automobile crank shaft, and for other purposes which will be readily apparent.

The features of my invention are the provision of a crank handle which can be folded or collapsed when not in use, together with the provision of means to prevent turning of the crank handle when not in use, so that it cannot be unscrewed or disconnected from the shaft.

These and other features and objects of my invention will be more readily understood by having reference to the accompanying drawings in which I have illustrated one embodiment of my invention.

Figure 1 is a front elevation of my improved crank handle in folded or collapsed position.

Fig. 2 is a horizontal sectional view through the casing, taken on the line 2—2 of Fig. 1, showing the crank handle in elevation.

Fig. 3 is a vertical sectional view through the casing, taken on the line 3—3 of Fig. 1, and showing the crank handle in extended or operating position.

Fig. 4 is a detail view partly in section on the line 4—4 of Fig. 1, showing the handle locked in folded position.

Fig. 5 is a like view showing the handle released so that it can be placed in its folded position.

I have illustrated the shaft 4, to be rotated by the crank arm, the end of which extends through the casing 5, which casing is secured to any suitable support by means of screws 6. Screwed upon the end of the shaft 4 is a crank arm 7 provided with a yoke-shaped end 8 within which the crank handle 9 is pivotally mounted. A coil spring 10 surrounds the pivoted end of the crank-handle, being connected at one end to the handle and at the other end to the crank arm 7, and serves to normally hold the handle in folded or collapsed position, as shown in Fig. 1. The enclosing casing 5 is curved inwardly, as indicated in Figs. 2 and 3, and thus forms a recess for the reception of the crank-handle so that when this crank-handle is in its collapsed or folded position it is located entirely within the casing thus protecting the parts.

In order to prevent rotation of this crank handle when in an inoperative, folded or collapsed position, I provide a stop 11 which projects from the base of the casing 5 and is located in the path of the handle 9 when this handle is in folded position, as shown in Fig. 1. The handle 9 engaging the stop in this manner is withheld from rotation in anti-clockwise direction and thus prevented from being rotated in such direction as to unscrew the crank-handle from the shaft. When the crank-handle 9 is in extended or operated position, the crank arm 7 is spaced a sufficient distance from the casing 5 so that it clears this stop 11, and thus the crank is free to be rotated. As soon as the crank handle 9 is released, the spring 10 causes it to immediately assume its folded or collapsed position, and the end of the handle is brought into position to be engaged by the stop 11 should attempt be made to rotate this crank in an anti-clockwise direction.

The crank-handle may, however, be connected to the crank arm in such a way as that when folded or in extended position for use, it is held in either position by the pressure of a spring, the means for accomplishing this result being shown more particularly in Figs. 4 and 5, and consisting of a locking bolt $10^a$ having a head $10^b$ with a rounded end adapted to engage either in a dished recess $10^c$ (Fig. 4) or a dished recess $10^d$ (Fig. 5) in the handle. A spring $10^e$ surrounding the shank of the locking bolt $10^a$ and finding a seat in the chamber $10^f$ in the crank arm causes the head of the locking bolt to press against the annular surface of the crank handle so that when the crank handle is moved into a vertical folded position the locking bolt $10^a$ engages with the dished recess $10^d$ on the handle, and when the handle is in its extended position for use causes the locking bolt to engage in the recess 10ᶜ of the crank handle, thus frictionally holding the crank handle against the pressure of the spring in its extended position for use or in folded position when not in use.

It will thus be seen that I have devised a very efficient crank handle and one which is adapted for a variety of uses and one in which the stop effectively prevents the crank from becoming unscrewed from the shaft. While I have illustrated and described one specific embodiment of my invention, it will be understood that I do not wish to be limited to the exact construction shown and described, as various changes and modifications may be made without departing from the spirit and intent of my invention.

What I claim as my invention is:

1. In a device of the class described, a shaft, a crank connected thereto, a handle pivotally connected to the outer end of said crank, spring means normally tending to maintain said handle substantially parallel to said crank, and means for preventing rotation of said crank in one direction.

2. In a device of the class described, a shaft, a crank connected thereto, a handle pivotally connected to the outer end of said crank, spring means normally tending to maintain said handle substantially parallel to said crank, and a stop for engaging the end of said handle when in normal or collapsed position to prevent rotation of said crank in one direction.

3. In a device of the class described, a shaft, a crank connected to said shaft, a crank handle pivotally connected to the outer end of said shaft, spring means normally tending to hold said handle in collapsed or folded position substantially parallel to said crank and permitting said handle to be moved outwardly into operating position, an enclosing casing surrounding said crank and handle and provided with a recess for receiving said crank and handle when in collapsed position, and a stop projecting from said casing adapted to engage with the end of said handle when in collapsed position to prevent rotation of said crank and handle in one direction.

4. In a device of the class described, a shaft, a crank connected thereto, a handle pivotally connected to the outer end of said crank, spring means normally tending to maintain said handle substantially parallel to said crank, a stop for engaging the end of said handle when in normal or collapsed position to prevent rotation of said crank in one direction and tension means for maintaining said handle in extended position.

Signed by me at Chicago, Illinois, this 16 day of May, 1923.

PETER C. BURNS.